United States Patent [19]
Barth et al.

[11] 3,874,263
[45] Apr. 1, 1975

[54] METAL PENETRATING STAPLE

[75] Inventors: Gerald D. Barth, Dundee; Ralph E. Jennings, Glen Ellyn, both of Ill.

[73] Assignee: Illinois Tool Works, Inc., Chicago, Ill.

[22] Filed: Jan. 9, 1974

[21] Appl. No.: 432,110

Related U.S. Application Data

[62] Division of Ser. No. 230,365, Feb. 29, 1972, Pat. No. 3,800,653.

[52] U.S. Cl. .................................... 85/13, 85/49
[51] Int. Cl. ........................................ F16b 15/06
[58] Field of Search ...................... 85/11, 13, 49

[56] References Cited
UNITED STATES PATENTS

| | | | |
|---|---|---|---|
| 308,837 | 12/1884 | Frost | 85/13 |
| 376,236 | 1/1888 | Collins | 85/11 |
| 430,034 | 6/1890 | O'Bolger | 85/13 |
| 2,034,080 | 3/1936 | Bitzenburger | 85/13 |
| 2,329,440 | 9/1943 | LaPlace | 85/11 |
| 2,369,961 | 2/1945 | Gisondi | 85/13 |

FOREIGN PATENTS OR APPLICATIONS

| | | | |
|---|---|---|---|
| 931,930 | 11/1947 | France | 85/31 |

*Primary Examiner*—Edward C. Allen
*Attorney, Agent, or Firm*—Robert W. Beart; Thomas W. Buckman

[57] ABSTRACT

A metal penetrating staple formed from a resilient sheet stock material and which has entering points, each including a pair of camming surfaces of dissimilar lengths. One longitudinal edge of each leg of the staple includes locking means which cooperate with the longest camming surface to produce a spring-like lock beneath a metal plate after the staple has penetrated the plate.

5 Claims, 11 Drawing Figures

PATENTED APR 1 1975　　3,874,263
SHEET 1 OF 2
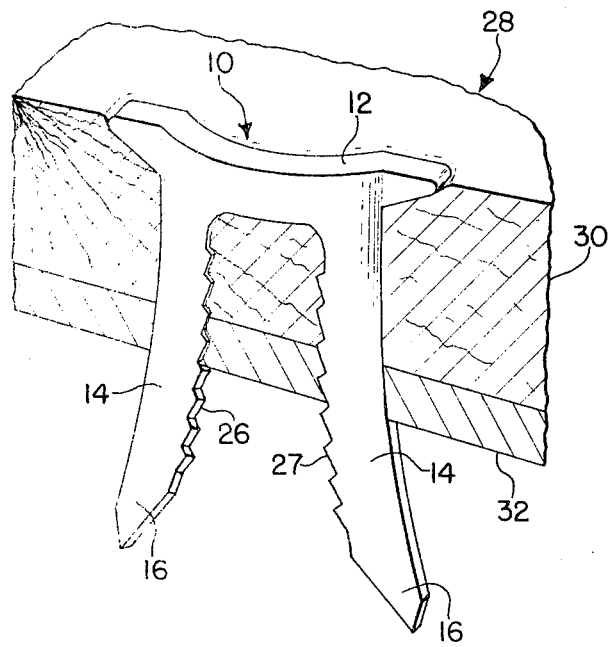
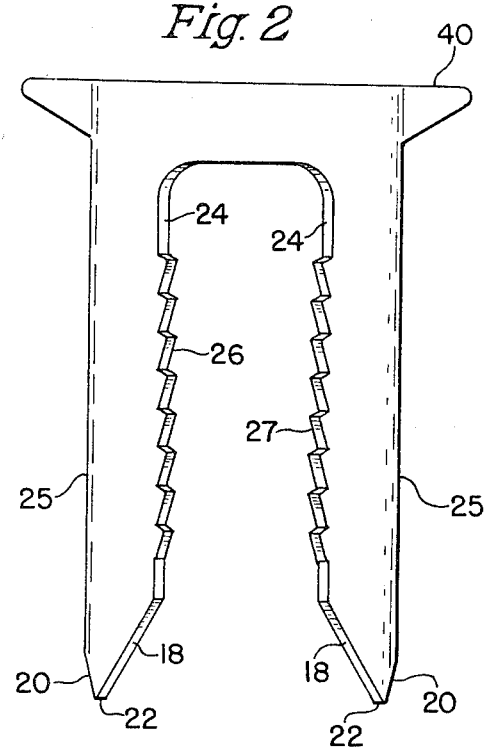
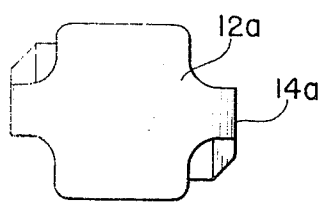
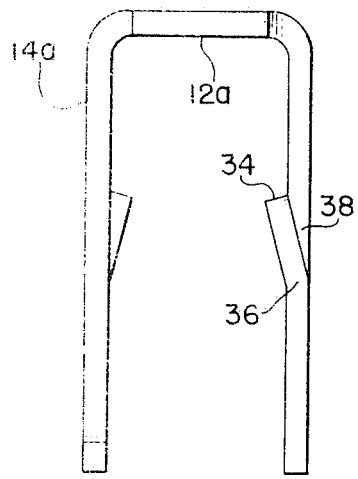
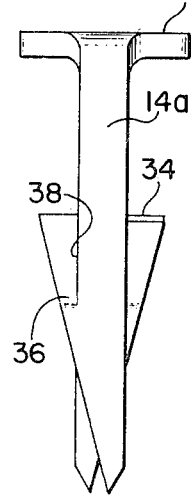
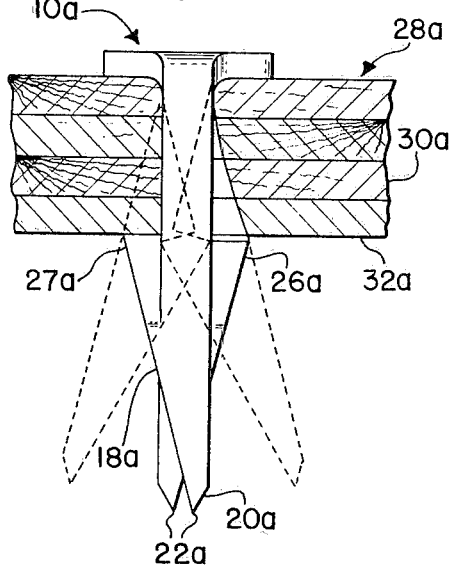

METAL PENETRATING STAPLE

This is a division of application Ser. No. 230,365, filed Feb. 29, 1972, now U.S. Pat. No. 3,800,653.

This invention relates to staples and is more particularly concerned with a staple which is particularly designed for use in fastening a plurality of workpieces, one of which is sheet metal.

The use of composite structures, such as wood or fibrous material and sheet metal, has presented a number of problems relating to the fastening systems which can be used to attach such workpieces together. Large scale applications of such composite structures require a fastener which may be secured rapidly with a minimum amount of preparation. Therefore, conventional systems, such as bolts and rivets, are cumbersome and uneconomical. Nailing systems or power actuated stud systems may be utilized in fastening such structures; however, certain environments require a fastening system which will remain secured under certain adverse conditions, such as vibration and impact. Conventional studs and nailing systems will not perform well in such adverse conditions. One example of such an environment would be construction used in a truck trailer.

Conventional staples normally cannot be used to fasten sheet metal in such environments because they generally lack the structural strength to penetrate the metal. While certain staples may have such structural strength, they are designed in such a manner as to require high energy forces to drive them through the metal and do not perform well in the above mentioned adverse conditions.

Accordingly, it is an object of this invention to provide a strong, resilient staple which will penetrate metal.

Another object of this invention is to provide a metal penetrating staple which is formed from spring-like material, the spring-like material cooperating with locking means on the legs of the staple to snap the staple in locking position when it is driven through the metal.

Yet another object of this invention is the provision of camming surfaces on entering points of the staple which force the legs to diverge against the bias of the spring-like material to permit a locking means to snap beneath a metal plate to securely anchor the staple against forces tending to loosen the connection.

Still another object of the invention is to provide a staple formed from a sheet stock material which is particularly adapted to fasten wood to metal and which resists the tendency of the wood to pull out from underneath the head of such a staple.

These objects of the invention and other features are obtained by a staple which is formed from a sheet material and hardened to give the staple a spring-like resilience and which includes a relatively long camming surface on the same longitudinal edge as a ratchet-like locking means. The cooperation of the longer camming surface with the locking means allows the legs to at least temporarily diverge as they are driven through the workpiece and then snap back into their original position with the locking means positioned beneath the workpiece.

The invention will be described in detail with reference to the accompanying drawings forming a part of the specification and in which FIG. 1 is a perspective view of one form of the staple after it has been driven through a composite wood and metal workpiece.

FIG. 2 is a front elevation view of the staple in FIG. 1.

FIG. 3 is a top plan view of the staple in FIG. 2.

FIG. 4 is a fragmentary cross-sectional view of another form of the staple associated with a composite wood and metal workpiece and which shows the staple in its full divergent position and lock position.

FIG. 5 is a top plan view of the staple shown in FIG. 4.

FIG. 6 is a front elevation view of the staple shown in FIG. 4.

FIG. 7 is a side elevation view of the staple shown in FIG. 4.

Figure 8:
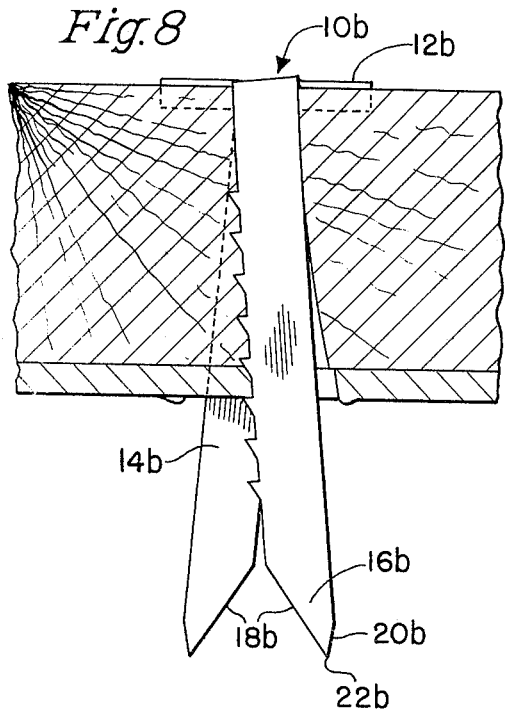
FIG. 8 is a fragmentary cross-sectional view of a composite workpiece fastened by yet another form of the staple.

Referring to FIGS. 1–3, it will be seen that staple 10, which can be economically stamped from sheet metal stock, includes a crown 12 and a pair of legs 14 with entering points 16. The use of thin stamped material serves to reduce the driving energy necessary to penetrate a metal workpiece. For purposes which will be apparent later, each entering point includes a pair of camming surfaces 18 and 20 which are of dissimilar lengths. One longitudinal edge 24 on each leg includes teeth or lock means 26 and 27. The longest camming surface 18 is associated with this longitudinal edge 24.

FIG. 3 illustrates the generally arcuate cross-sectional configuration of staple 10. This embodiment of the invention enables the staple to be used with wood workpieces, such as 30 in FIG. 1, and reduces the tendency of such a fastener to split the wood when it is driven in the wood.

The unique configuration of the entering point 16 in conjunction with the ratchet-like locking teeth 26 and 27 allows the staple to be particularly effective to penetrate through metal, such as workpiece 32 in FIG. 1. It has been found to be particularly advantageous to work harden the staple and give it a spring-like characteristic. As the staple 10 is driven through a metal workpiece 32, the long camming surfaces 18 tend to force the legs apart as in FIG. 1. When the staple reaches its desired penetration through the metal, the elastic memory of the legs will force the legs to tend to return to the original position, such as that in FIG. 2. This springback of the legs in conjunction with the teeth located on the inner edges 24 of the staple provides a positive ratchet-like lock for the fastening system.

It should be noted that the double camming surfaces 18 and 20 are particularly important in the penetration of metal. The provision of surface 20 extending from apex 22 to the outer longitudinal edge 25 provides a sound structural backing for the point to enable it to effectively penetrate the metal. It is particularly advantageous to offset the apex 22 from the center line of the leg. Without such an offset, the point may be too blunt to penetrate the metal and still provide the proper camming features. It has been found that an apex having an included angle of about 45° with the short camming surface extending about 30° to the longitudinal axis and the long camming surface extending about 15° to the longitudinal axis will effectively penetrate the metal workpiece.

The placement of legs 14 at an angle to each other, as a result of the curvature of the crown 12, allows the divergence of the legs to be greater. This is due to the fact that the bending or divergence of the legs will occur, at least partially, out of the plane of the legs.

The provision of ears 40 serves to increase the surface contact area for the head of the staple which decreases the possibility that the wood will pull out from under the head of the staple.

FIGS. 4–5 illustrate a second embodiment of the invention. The staple 10a includes long camming surfaces 18a and shorter camming surfaces 20a on each leg. This staple also includes an enlarged head or crown area 12a which is extremely helpful in retaining the wood and preventing the wood from pulling out from beneath the head. This embodiment of the invention is shown with a laminated structure including wood layers 28a and 30a as well as a metal sheet 32a.

In operation, staple 10a performs in a manner similar to the staple described in FIGS. 1–3. As the legs 14a penetrate the metal 32a, the longer camming surface forces the legs to diverge in a scissor-like fashion as shown in dotted lines in FIG. 4. When the staple has penetrated a predetermined depth, which is generally determined by the abutment of head 12a on the uppermost panel 28a, the spring-like legs tend to return to their original positions. In this embodiment, a single tooth is formed from the camming surface 18a and a shelf-like portion 34. The shelf portion 34 extends generally perpendicular to the longitudinal edge of the leg and is positioned intermediate the apex 22a and the head 12a. The thickness of the laminated workpiece may determine the exact distance of shelf 34 from the head 12a.

Staple 10a may also provide a locking surface in a plane perpendicular to the plane of the legs, as well as in a plane generally parallel to or coincident with the plane of the legs. This is accomplished by biasing the tooth 26a out of the plane of the legs. This secondary locking structure may be accomplished by a slit 38 and a hinge-like portion 36 connecting the teeth 26a or 27a to the leg 14a.

Figure 9:
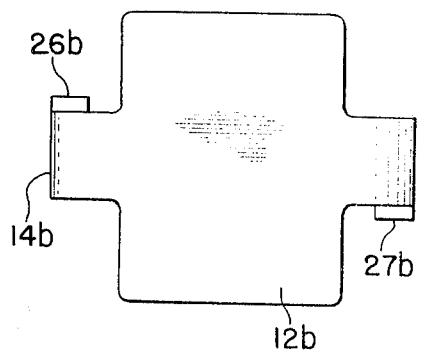
FIG. 9 is a top plan view of the staple shown in FIG. 8.
Figure 10:
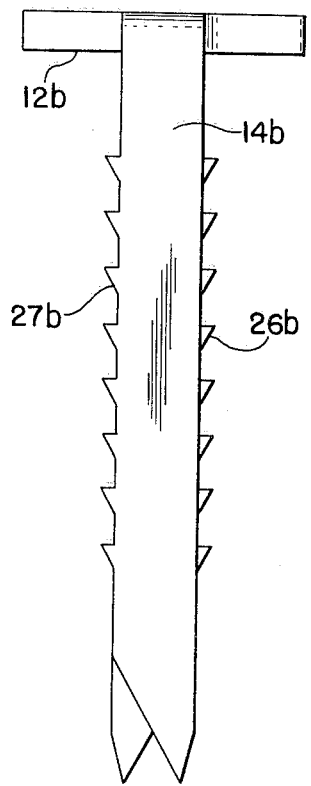
FIG. 10 is a side elevation view of the staple shown in FIG. 8.
Figure 11:
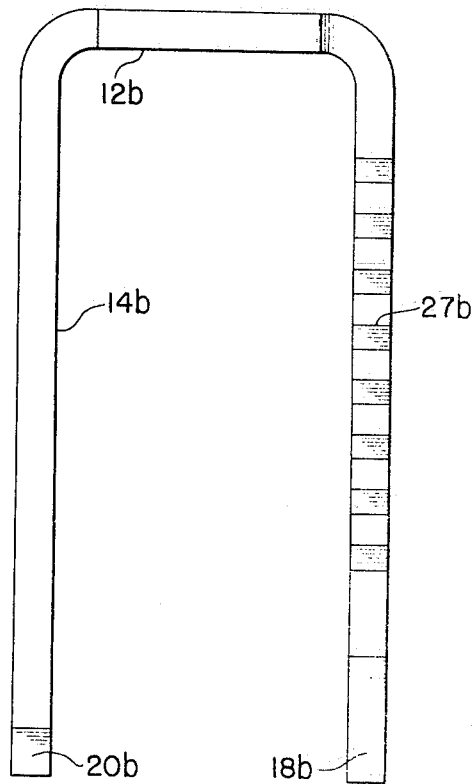
FIG. 11 is a front elevation view of the staple shown in FIG. 8.

FIGS. 8–11 show a further embodiment of the invention wherein staple 10b is similar to the staple 10a except that one longitudinal edge of each leg is provided with a plurality of ratchet-like teeth 26b or 27b. This staple should also be hardened to give the legs the proper spring-like bias which enables the ratchet-like teeth 26b or 27b to snap back and lock beneath the metal panel.

Thus it is apparent that there has now been provided a staple which is particularly adapted to penetrate through a sheet metal workpiece and be lockingly retained in such a workpiece. While the invention has been described in conjunction with specific embodiments thereof, it is evident that many alternatives, modifications, and variations will be apparent to those skilled in the art in light of the foregoing description. Accordingly, it is intended to embrace all such alternatives, modifications and variations as fall within the spirit and broad scope of the appended claims.

We claim:

1. A metal-penetrating staple formed from sheet stock material including a crown portion and pair of legs extending therefrom, the legs each including an entering point formed from a pair of unequal camming surfaces intersecting at an apex, one edge of each leg including means for locking the staple in an associated workpiece, the longest camming surface of the entering point being located on the same edge of the leg on which the locking means is located, the staple being formed of a resilient material which enables the locking means to spring into locking position when the staple is driven through a metal workpiece, the axial dimensions of the crown section and legs lying in a common arcuate cross-sectional path when viewed in planes generally perpendicular to the longitudinal axis of the staple, said crown and leg portions being generally the same thickness, clamping ears formed integral with the crown and extending outwardly therefrom, said ears lying in a common longitudinal plane which intersects the arcuate path to distribute the clamping load in a plane different than the place of the penetration of the legs.

2. A metal-penetrating staple in accordance with claim 1 wherein the longitudinal edges which include the locking means face one another permitting the legs to diverge upon entering a workpiece while being biased toward one another to force the locking means to lockingly engage the under surface of a workpiece.

3. A metal-penetrating staple in accordance with claim 1, wherein the uppermost edge of the clamping ears is coplanar with the uppermost extremity of the crown portion and the lowermost edge of the ears taper upwardly from the outside edge of the legs to generally intersect with the uppermost edge of said ears.

4. A metal-penetrating staple in accordance with claim 1, wherein the locking means include a plurality of teeth located along the longitudinal edge of the leg.

5. A metal-penetrating staple in accordance with claim 1, wherein the width of the crown portion is greater than the combined width of the legs.

* * * * *